United States Patent [19]

Kelch et al.

[11] 3,995,790
[45] Dec. 7, 1976

[54] CASSETTE FOR TAPE-SHAPED RECORD CARRIERS

[75] Inventors: Heinz Kelch, Buchenberg; Hilmar Kirchgessner; Eduard Schuh, both of Villingen-Schwenningen, all of Germany

[73] Assignee: Kienzle Apparate GmbH, Villingen, Germany

[22] Filed: Apr. 22, 1975

[21] Appl. No.: 570,457

[30] Foreign Application Priority Data

Apr. 24, 1974 Germany .......................... 2419686

[52] U.S. Cl. .............................. 242/199; 352/78 R
[51] Int. Cl.² .................. G03B 1/04; G11B 15/32; G11B 23/04
[58] Field of Search .......................... 242/197–200, 242/192, 71.2; 352/72–78 R; 40/86 A; 360/93, 96, 132

[56] References Cited
UNITED STATES PATENTS

| 3,495,787 | 2/1970 | Wallace | 242/199 |
| 3,600,071 | 8/1971 | Downey | 352/78 R |
| 3,602,458 | 8/1971 | Doby et al. | 242/199 |
| 3,758,048 | 9/1973 | Sugaya et al. | 242/199 |

*Primary Examiner*—Leonard D. Christian
*Attorney, Agent, or Firm*—Michael J. Striker

[57] ABSTRACT

A cassette for tape-shaped record carriers having optically viewable recordings has a housing provided with a pair of opposite but spaced end walls and a pair of opposite but spaced side walls which connect the end walls and one of which is transparent. A pair of tape hubs is rotatably mounted in the housing and a tape is convoluted on and extends between the hubs for travel from one to the other thereof. One of the end walls is provided with an opening through which a recording device has access to the tape so as to provide recordings on the same. A guide arrangement in the interior of the housing guides the tape so that when it travels from one to the other of the hubs it must first pass the opening and thereupon must travel past the transparent side wall so that, when the cassette is inserted into an optical readout device, the recordings on the tape are visible through the side wall.

11 Claims, 3 Drawing Figures

CASSETTE FOR TAPE-SHAPED RECORD CARRIERS

BACKGROUND OF THE INVENTION

The present invention relates to a cassette for tape-shaped record carriers, and more particularly to a cassette for tape-shaped record carriers having optically viewable recordings. In particular, the invention relates to such a cassette which is to be inserted into an optical readout device so that the device is capable of reading the recordings provided on the record carrier in the cassette.

There are many applications where tape-shaped record carriers are used which are provided with optically viewable recordings, for example recordings which are produced on them by stilii or the like. These recordings are then subsequently read in an optical reader, and it is customary in many instances to mount the record carrier on hubs which are secured in an open frame. In many instances, this frame can be made exchangable or it can be so constructed that it can be removed from the reading device or registering device, as the case may be, for maintenance and inspection and for changing the tape hubs which are mounted in the frame so that new tape hubs with a new tape-shaped record carrier can be mounted in the frame.

However, in many instances these prior-art arrangements are not satisfactory. Particularly where the recorded carrier is to be subjected to subsequent operations, for example for the purpose of analysis of records provided on it, such as the analysis of times, quantities or the like that are recorded on the record carrier, the prior-art arrangements provide insufficient protection against mechanical damage to the record carrier. Evidently, if mechanical damage occurs, the record carrier may become mutilated and the record may then be wholly or partly destroyed. Also, many of the prior-art arrangements are not even completely removable from the reading device, but can only be flipped to an outwardly accessible position for the change of the tape hubs. Particularly disadvantageous in the prior-art arrangements is the fact that they are not suitable for employment in a machine analysis of recorded data on the record carrier, because they cannot be properly stored without the danger of damage to the record carrier and for the same reasons they cannot be readily transported.

It is already known to provide tape cassettes having magnetic tape therein, such as the so called "Phillips" cassette. However, these cassettes are not suitable for use with tape-shaped record carriers which are provided with optically viewable recordings, because they do not permit a viewing of the recordings of a record carrier within the cassette housing. This is not necessary in the cassettes having magnetic tape. Moreover, in that type of cassette, no problems exist in terms of providing an optimum positioning of the tape with respect to the position of the recording device and/or reading device.

SUMMARY OF THE INVENTION

It is a general object of this invention to overcome the disadvantages of the prior art.

In particular, it is an object of the present invention to provide an improved cassette for tape-shaped record carriers which have optically viewable recordings thereon, for example for record carriers in form of paper strips which are coated with wax or a metal layer, and on which visually observable recordings are produced and subsequently to be read.

Another object of the invention is to provide such a cassette which makes it possible to view a significant portion of the record carrier from the exterior of the cassette housing.

Another object of the invention is to provide such a cassette wherein the position of one or more openings through which a recording device can gain access to the tape to make recordings thereon, is so selected that they preclude contact with and possible damage to the record carrier during insertion into and removal from a recording and/or reading device.

Still another object of the invention is to provide such a cassette wherein the record carrier is protected not only against accidental damage, but also against the possibility of falsification.

The cassette according to the present invention is also to be so constructed that it can be readily machine processed, i.e., that it can be exactly positioned in a machine for recording and/or reading.

Another object of the invention is to provide such a cassette which is highly resistant to deformation and can be readily operated, particularly handled with one hand by an operator, and also can be stacked in a space-saving manner.

Still another object of the invention is to provide such a cassette wherein a tape hub having the record carrier preconvoluted thereon can be readily mounted in the cassette.

In keeping with these objects, and with others which will become apparent hereafter, one feature of the invention resides in a cassette for tape-shaped record carriers having optically viewable recordings which, briefly stated, comprises a housing having a pair of opposite but spaced end walls and a pair of opposite but spaced side walls which connect the end walls and one of which is transparent. A pair of tape hubs is rotatably mounted in this housing and a tape is convoluted on and extends between the hubs for travel from one to the other thereof. An opening is provided in one of the end walls for access of a recording device to the tape. Guide means is provided in the housing for guiding the traveling tape past the opening in the one end wall so that a recording device may provide recordings on the tape, and thereafter the traveling tape must pass the transparent side wall so that the recordings on the tape are visible therethrough.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
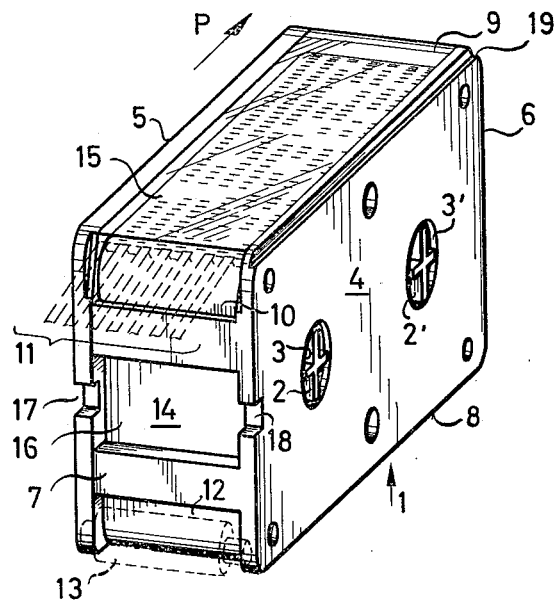
FIG. 1 is a perspective illustrating a cassette embodying the invention.
Figure 3:
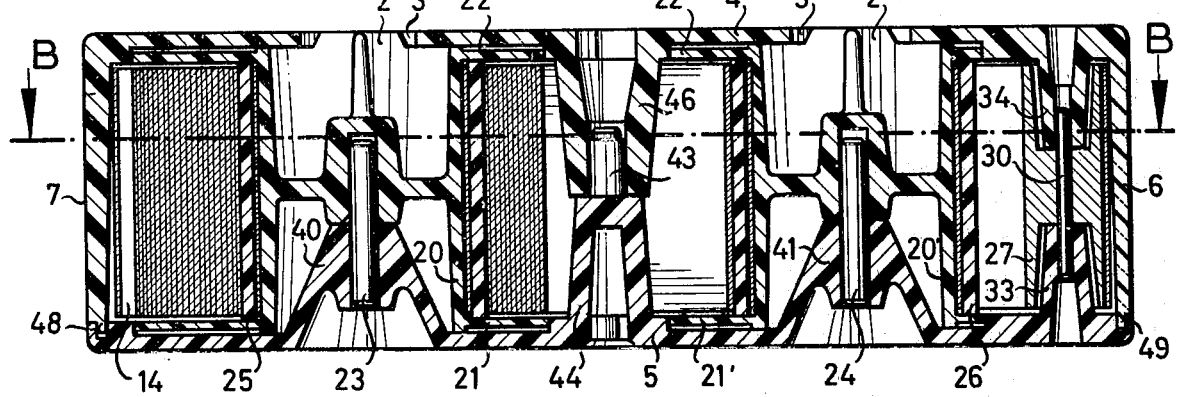
FIG. 3 is a section taken on line A—A of FIG. 2.
Figure 2:
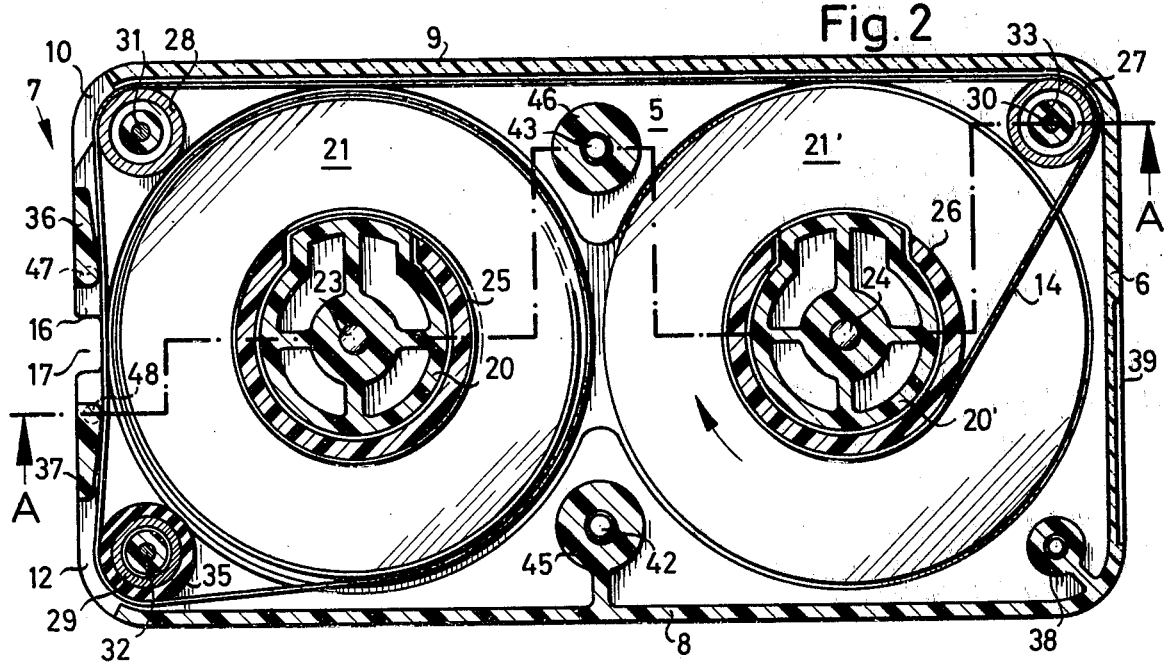
FIG. 2 is a longitudinal section taken on line B—B of FIG. 3.

Referring now in detail to the drawing, which in FIGS. 1–3 shows a single exemplary embodiment of the invention, it will be seen that one major wall 4 of the cassette 1 is provided with openings 3, 3' in which coupling portions 2, 2' are exposed of tape hubs 20, 20' on which a strip-shaped record carrier is to be convoluted. The coupling portions 2, 2' serve to couple the hubs 20, 20' with a drive of an appropriate device (not shown) which will engage and rotate the hubs analogous to the manner in which this is known from cassettes of cassette tape recorders. The cassette 1 has a substantially rectangular configuration and is provided with two longitudinally spaced end walls 6 and 7 and two transversely spaced side walls 8 and 9 which connect the end walls 6 and 7. It further has two main walls, the main wall 4 mentioned above and a further main wall 5 which is transversely spaced from the main wall 4; these main walls 4 and 5 connect the walls 6–9. In the illustrated embodiment, one of the end walls, namely the end wall 7, is provided with an opening 10 through which scribing electrodes 11 of a well known scribing device (U.S. Application of Heinz KELCH et all, Ser. No. 434,980 or German Offenlegungsschrift Ser. No. 1 548 578) can enter the interior of the cassette for contact with the tape-shaped record carrier on which they will provide recordings by burning portions of a coating on a record carrier (e.g., a metallic coating) off the underlying carrier strip which may be of paper or the like. The cassette 1 is further provided with an opening 12 for the entry of a counter electrode 13 which cooperates with the writing electrodes 11; the electrodes 11 and 13 are in contact with the metallized surface of the record carrier 14 and produce a marking or recording 15 when the electrodes 11 are connected to a source of electrical energy. How this is done is already well known in the art and forms no part of this invention. Merely for the sake of completeness it is mentioned that independently of its electrical control, the entire set of writing electrodes 11 is constantly moved to-and-fro transversely of the direction of advancement of the record carrier 14, during the production of recordings on the record carrier. Other types of producing recordings can, of course, also be utilized, on a thermal basis, or in any other way known in the art.

One of the side walls 9 is transparent so that a relatively long portion of record carrier, which advances it in direction of the arrow P, is viewable from the exterior of the cassette without any danger that it might become mechanically damaged. An opening 16 in the end wall 7, which is preferably arranged symmetrically with reference to the openings 10 and 12, serves for entry of a lens or the like of a viewing device, not shown but like U.S. Pat. No. 3,655,948, whereas the cutouts 17 and 18 serve to determine th position of the cassette in the viewing device, or in another device into which it is to be inserted. A cutout 19 serves as a guide which assures that the cassette can be inserted into any cooperating device only in a predetermined orientation and duration.

FIG. 2 shows the guide means for the record carrier 14. The record carrier 14 is originally present on the hub 20 and during the recording operation, that is during the formation of recordings on the record carrier 14, the latter is convoluted onto the hub 20'. An external drive which is not shown, but which cooperates with the coupling portions 2 or 2' (in the illustrated embodiment 2' since the carrier 14 is to be convoluted onto the hub 20'), if its the rotation of the hub 20'. For improved guidance and reduction of friction, the hubs 20, 20' are formed with flanges 21, 22 and 21', 22'. The hubs 20 and 20' are turnably journalled on pivots 23 and 24 which are formed on the major wall 5 and are advantageously produced of one piece. The opposite ends of the record carrier 14 are connected to the hubs 20, 20' in appropriate manner, in the illustrated embodiment by means of clamps 25 and 26 which, as shown in FIG. 2, are so configurated that they do not project outwardly beyond the surfaces of the hubs to assure that tape convolutions will not be of an out-of-round configuration thereon.

It will be appreciated that if the hub 20' is driven in the direction indicated by the arrow, the record carrier 14 is pulled off the hub 20 and travels over the guide rollers 27, 28 and 29 which are turnably journalled in the interior corners formed by the walls 6, 7, 8, 9. The rollers 27, 28 and 29 are respectively mounted on pivots 30, 31 and 32 which are mounted in bearing eyes formed in the major walls 4 and 5. Only the eyes for the pivot 30 are designated with reference numerals 33 and 34, respectively, but it will be appreciated that the other pivots 31 and 32 have similar eyes.

In addition to serving as a guide and direction-reversing roller for the carrier 14, the roller 28 has the further purpose of serving as a backing for the writing electrodes 11. A sleeve 35 of elastically yieldable material which is provided on the periphery of the roller 29 serves as a backing or contact for the counter electrode 13, so that a reliable electrical contact can be established which does not depend upon possible tolerance variations of any of the components involved.

The end wall 7 has web-shaped wall portions 36 and 37 which are so configurated, particularly widened, that they serve as part of the guide means for the record carrier 14, guiding the portion of the record carrier 14 which travels intermediate the rollers 28, 29. Because of this, the portion in question is precisely positioned intermediate the web-shaped portions 36 and 37 for the electro-optical reading of the record carrier.

The connecting portions connecting parts of the cassette housing together, which is still to be described and of which one portion 38 is shown in section in FIG. 2, could also be so constructed that a fourth guide roller could be mounted. In this manner, it would then also be possible to make the end wall 9 transparent so that a still further portion of the record carrier could be exposed for visual examination. However, in the embodiment that is illustrated in the drawing, a pocket 39 is formed at the end wall 6 for insertion of a label or the like. The cassette housing per se is composed of two portions, for example of two identically configurated shell sections which may have an identical depth. This assures a maximum resistance of the housing to flexing and deformation. However, since the parting line between the two shell sections will then be located in a central plane intermediate the major walls 4 and 5, this has disadvantages in terms of serving the visually observable portion of the record carrier 14. Also, it would not be possible in such a construction to place hubs which have previously had record carriers convoluted on them, onto the associated pivots either by hand or by machine. This, however, is important to make a high-speed manufacture of such cassettes possible, since it will eliminate one part of the cassette housing with the pivots for the hubs thereon, and with the hubs mounted on the pivots and provided with the record carrier, to be connected in a simple manner and at high speed with another part of the cassette housing to complete the assembly and manufacture in a single operating step. For this reason, it is currently preferred that, as shown in the drawing, the cassette housing be composed of one portion having the walls 6, 7, 8 and 9 and the major wall 4 connecting them, and a further portion composed of the major wall 5 which constitutes a cover or lid for the open side of the box-shaped portion composed of the walls 6–9 and 4. Advantageously, the walls 6–9 and 4 may be made in their entirety of transparent material, rather than merely the wall 9. Since the wall 5 has no side wall portions or end wall portions that might interfere with the assembly, the advantages outlined above are obtained in this manner.

The wall 5 is connected with the box formed by the walls 6–9 and 4 by means of kerf connections, pins 42 and 43 being provided in the spaces located intermediate the hubs 20 and 20' and the side walls 8 and 9; these pins are provided on bosses 44, one of which is shown in FIG. 3. The pins 42 and 43 cooperate with sleeves 45 and 46 into which they are to be pushed. FIG. 3 shows that the line of separation of the cooperating portions is located in the center plane between the walls 4 and 5, in order to maintain the lever arms as short as possible. Additional cooperating connecting portions 47, 48 and 49 (only partly shown) connect the walls 6–9 and the webs 36 and 37 with the wall 5.

The various walls may be made of a suitable synthetic plastic material, for example plexiglas (TM), Makrolon (PC), Terloran (ABS) or the like.

It is a particular advantage of the cassette according to the present invention that essentially all openings required for producing the recording on the record carrier are located only on a single wall, namely on one of the short end walls, so that the entire length of the cassette is available for handling of the cassette and for viewing of a rather long portion of the record carrier 14. The possibility of mechanical damage of the record carrier during handling or storage, for example when the cassette is grasped by the hand of a user, is largely eliminated, and the assembly of the various components of the cassette is greatly facilitated and can be carried out mechanically and in series production.

It will be understood that each of the elements described above, or two or more together, may also find a useful application in other types of constructions differing from the type described above.

While the invention has been illustrated and described as embodied in a cassette for tape-shaped record carriers, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A cassette for tape-shaped record carriers having optically viewable recordings, comprising a housing having a pair of opposite but spaced end walls and a pair of opposite but spaced side walls which connect said end walls and one of which is transparent; a pair of tape hubs rotatably mounted in said housing; a tape convoluted on and extending between said hubs for travel from one to the other thereof; an opening in one of said end walls for access of a recording device to said tape; and guide means in said housing for guiding the traveling tape past said opening in said one end wall substantially parallel to said one end wall so that a recording device may provide recordings on the tape, and thereafter past said transparent side wall substantially parallel to the same so that the recordings on the tape are visible therethrough and will be exposed to view.

2. A cassette as defined in claim 1, wherein said one end wall and said one side wall include with one another an interior corner; said guide means including a guide roller located in said interior corner substantially opposite said opening to serve as a tape backing when said recording device records on said tape. will 3. A cassette as defined in claim 1, wherein said one end wall efines with said side walls two interior corners, said guide means including two guide rollers each located in one of said corners.

4. A cassette for tape-shaped record carriers having optically viewable recordings, comprising a housing having a pair of opposite but spaced end walls and a pair of opposite but spaced side walls which connect said end walls and one of which is transparent, said one end wall defining with said side walls two interior corners, said one end wall and said side walls each being formed with a cutout adjacent the respective roller, and said one end wall having a further opening symmetrical with reference to said cutouts; a pair of tape hubs rotatably mounted in said housing; a tape convoluted on and extending between said hubs for travel from one to the other thereof; an opening in one of said end walls for access of a recording device to said tape; and guide means in said housing, including two guide rollers each located in one of said corners, for guiding the traveling tape past said opening in said one end wall so that a recording device may provide recordings on the tape, and thereafter past said transparent side wall so that the recordings on the tape are visible therethrough and will be exposed to view.

5. A cassette as defined in claim 4, wherein wall portions of said one end wall intermediate said further opening and said cutouts constitute part of said guide means.

6. A cassette as defined in claim 4, wherein said side walls form with the other end wall two additional interior corners, said other end wall being transparent and said guide means including two additional rollers each mounted in one of said additional corners.

7. A cassette as defined in claim 1; further comprising a first main wall connecting all of said end and side walls to form therewith a box having an open side, and a second main wall forming a closure for said open side, at least said box being of transparent material.

8. A cassette as defined in claim 7; further comprising cooperating connecting portions on said box and said second main wall.

9. A cassette as defined in claim 8, wherein said connecting portions are arranged so that the plane of separation of the cooperating connecting portions corresponds to the center plane between said main walls.

10. A cassette as defined in claim 7; further comprising bearing portions on said second main wall for mounting said hubs rotatably in said cassette.

11. A cassette for tape-shaped record carriers having optically viewable recordings, comprising a housing having a pair of opposite but spaced end walls, a pair of opposite but spaced side walls which connect said end walls and one of which is transparent, and a first main wall connecting all of said end and side walls to form therewith a box having an open side, and a second main wall forming a closure for said open side, at least said box being of transparent material; a pair of tape hubs rotatably mounted in said housing and being spaced from one another lengthwise of said side walls; comprising cooperating connecting portions on said box and said second main wall in the region intermediate said hubs; first retaining portions on said end walls and side walls and cooperating second retaining portions on said second main wall; a tape convoluted on and extending between said hubs for travel from one to the other thereof; an opening in one of said end walls for access of a recording device to said tape; and guide means in said housing for guiding the traveling tape past said opening in said one end wall so that a recording device may provide recordings on the tape, and thereafter past said transparent side wall so that the recordings on the tape are visible therethrough and will be exposed to view.

* * * * *